United States Patent
Neumann et al.

(10) Patent No.: US 9,796,314 B2
(45) Date of Patent: Oct. 24, 2017

(54) TRACK COVER FOR MOVING AXIS COMPARTMENT DOOR

(71) Applicant: FORD GLOBAL TECHNOLOGIES, LLC, Dearborn, MI (US)

(72) Inventors: Michael Neumann, Gisborne (AU); Vikas Saigal, Melbourne (AU); Christopher Emery Fesenmyer, Flat Rock, MI (US); Scott Simon, Dexter, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 118 days.

(21) Appl. No.: 14/825,901

(22) Filed: Aug. 13, 2015

(65) Prior Publication Data

US 2017/0043696 A1 Feb. 16, 2017

(51) Int. Cl.
*B60N 3/00* (2006.01)
*B60N 3/10* (2006.01)
*E05D 13/00* (2006.01)
*B60R 7/04* (2006.01)

(52) U.S. Cl.
CPC .............. *B60N 3/102* (2013.01); *B60R 7/046* (2013.01); *E05D 13/1276* (2013.01)

(58) Field of Classification Search
CPC ........... B60R 7/046; B60R 7/04; B60N 3/102; E05D 13/1276
USPC .............................................. 296/37.8, 24.34
See application file for complete search history.

(56) References Cited

U.S. PATENT DOCUMENTS

| 4,640,542 | A  | 2/1987  | Watjer et al. |
| 5,409,277 | A  | 4/1995  | Rogers, Jr. et al. |
| 5,924,780 | A  | 7/1999  | Ammon et al. |
| 6,205,714 | B1 | 3/2001  | Staser et al. |
| 6,557,913 | B1 | 5/2003  | Kunst |
| 6,669,258 | B1 | 12/2003 | Kato |
| 6,796,591 | B2 | 9/2004  | Yanagita |
| 7,104,009 | B2 | 9/2006  | Ishii et al. |
| 7,568,601 | B2 | 8/2009  | Kogami et al. |
| 7,669,288 | B2 | 3/2010  | Zeilbeck et al. |
| 8,127,962 | B2 | 3/2012  | Kogami |
| 8,234,752 | B2 | 8/2012  | Anderson |

(Continued)

FOREIGN PATENT DOCUMENTS

| CN | 101680255 B | 8/2013 |
| EP | 1319780 A1  | 6/2003 |
| EP | 2055869 B1  | 1/2011 |

OTHER PUBLICATIONS

English machine translation for EP1319780A1.

(Continued)

*Primary Examiner* — Joseph D Pape
(74) *Attorney, Agent, or Firm* — Vichit Chea; King & Schickli PLLC

(57) ABSTRACT

An assembly for mounting a door with a vehicle compartment includes an arm coupled with the compartment and with the door, a track fixed with the compartment, and a carrier pivotably coupled with the door and slidable along the track. The assembly further includes a spring coupled between the door and the compartment such that a contraction of the spring alone causes the door to move with rotation of the arm and movement of the carrier along the track. A track cover engages the carrier to prevent disengagement of the carrier from the track.

18 Claims, 9 Drawing Sheets

(56) References Cited

U.S. PATENT DOCUMENTS

| | | |
|---|---|---|
| 8,347,462 B2 | 1/2013 | Lowry et al. |
| 8,388,040 B2 | 3/2013 | Bone |
| 2004/0144142 A1 | 7/2004 | Dimig et al. |
| 2015/0375684 A1* | 12/2015 | Gillis ................. B60R 7/04 296/24.34 |

OTHER PUBLICATIONS

English machine translation for CN101680255B.
U.S. Appl. No. 14/465,101; "Moving Axis Compartment Door", filed Aug. 21, 2014.

* cited by examiner

TRACK COVER FOR MOVING AXIS COMPARTMENT DOOR

TECHNICAL FIELD

The present disclosure generally relates to mechanisms for controlling and actuating the movement of vehicle interior compartment doors.

BACKGROUND

Automotive interiors often feature a number of compartments in various locations, such as along the center console or the instrument panel. Such compartments may have a door associated therewith to allow an occupant of the vehicle to alternately open and close the compartment. The spatial requirements of a vehicle interior have resulted in such doors being movably mounted with respect to associated compartments in various "moving axis" configurations. Such configurations allow the edges of the doors to be spaced flush with respect to adjacent vehicle interior surfaces with a minimal gap therebetween, while still allowing reliable opening and closing of the respective door. Further, such moving axis configurations can allow for a door, when open, to retract into the console, adjacent to or within the associated compartment.

It has been common to configure moving axis door mechanisms to be spring-biased toward either the open or closed direction such that movement to such direction can be driven. Spring-biased moving axis mounting mechanisms have generally required a number of different torsion and extension springs (e.g. four or more) to control both rotational and linear motion to impart the desired kinematics, which include rotational and linear motion. Further, multiple dampers have also been required to control such spring-driven motion. The use of multiple springs, dampers, and the like adds to the complexity and cost of the mounting mechanisms.

In spring-biased mounting assemblies for vehicle doors, push-push latching mechanisms can be used to maintain a position of the associated door against the biasing force. For example, in a door mounting assembly biased toward the open position, a push-push latch can be used to maintain the door in the closed position. In many examples, the push-push latch may be found in a position along the door itself, which may expose a portion of the latch to contamination from debris or the like within the vehicle interior.

Accordingly, a moving-axis door mounting mechanism is desired with fewer springs or dampers. It may be further desired to incorporate a concealed push-push latching mechanism.

SUMMARY

According to one aspect of the present invention, an assembly for mounting a door with a vehicle compartment includes an arm coupled with the compartment and with the door, a track fixed with the compartment, and a carrier pivotably coupled with the door and slidable along the track. The assembly further includes a spring coupled between the door and the compartment such that a contraction of the spring alone causes the door to move with rotation of the arm and movement of the carrier along the track.

According to another aspect of the present invention, a vehicle interior console includes a compartment having a track fixed therewith and a door coupled with the track about an axis. The console also includes a mounting mechanism having an arm coupled between the compartment and the door and a spring coupled between the door and the compartment such that a contraction of the spring alone causes the door to move with rotation of the arm and movement of the axis along the track.

According to another aspect of the present invention, a vehicle interior compartment assembly includes a cavity housing defining an opening and having a track and a notch fixed therewith, a door positionable over the opening, and a carrier slidably coupled with the track and rotatably coupled with the door. The carrier has a damper fixed therewith that is operatively engaged with a portion of the track and further has a latch engageable with the notch to retain the door in a position over the opening.

These and other aspects, objects, and features of the present invention will be understood and appreciated by those skilled in the art upon studying the following specification, claims, and appended drawings. As it should be realized, the described aspects, objects, and features are capable of other, different embodiments and its several details are capable of modification in various, obvious aspects all without departing from the devices and methods as set forth and described in the following claims. Accordingly, the drawings and descriptions should be regarded as illustrative in nature and not as restrictive.

BRIEF DESCRIPTION OF THE DRAWINGS

The accompanying drawing figures incorporated herein and forming a part of the specification, illustrate several aspects of the disclosed track cover for moving axis compartment door, and together with the description serve to explain certain principles thereof. In the drawings.

Reference will now be made in detail to embodiments of the disclosed track cover, examples of which are illustrated in the accompanying drawing figures.

DETAILED DESCRIPTION

Figure 1:
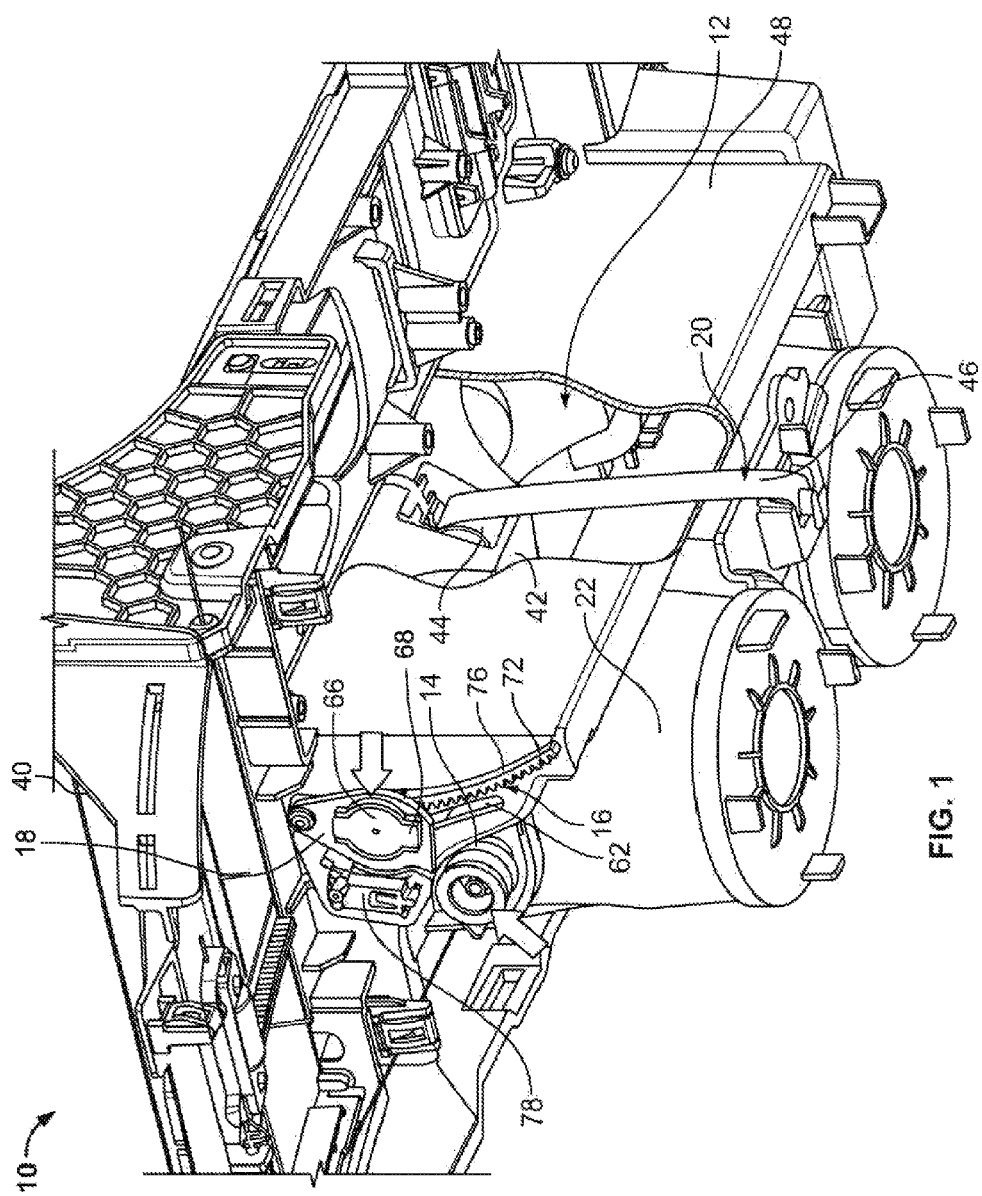
FIG. 1 is a perspective view of internal components of a console assembly having a door moveably affixed over a compartment by a mounting mechanism.

For purposes of description herein, the terms "upper," "lower," "right," "left," "rear," "front," "vertical," "horizontal," "interior," "exterior," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature of component extending in or along a given direction or the like does not mean that the feature or component follows a straight line or axis in such a direction or that it only extends in such direction or on such a plane without other directional components or deviations, unless otherwise specified.

Turning now to the Figures, where like reference numerals are used to indicate like features, a mechanism is shown for mounting a door 10 with a vehicle compartment 12. The mechanism includes an arm 14 coupled with the compartment 12 at one end thereof and coupled with the door 10 at another end thereof. A track 16 is fixed with the compartment 12, and a carrier 18 is pivotally coupled with the door 10 and is further operably coupled with the track 16 so as to be slidable there along. A spring (not shown in FIG. 1) is coupled between the door 10 and the compartment 12 such that a contraction of the spring alone causes the door 10 to move with rotation of the arm 14 and movement of the carrier 18 along the track 16. In the example shown, compartment 12 includes a compartment housing 22 to which track 16 is fixed by integral formation therewith, and with which arm 14 is pivotally coupled.

Figure 2:
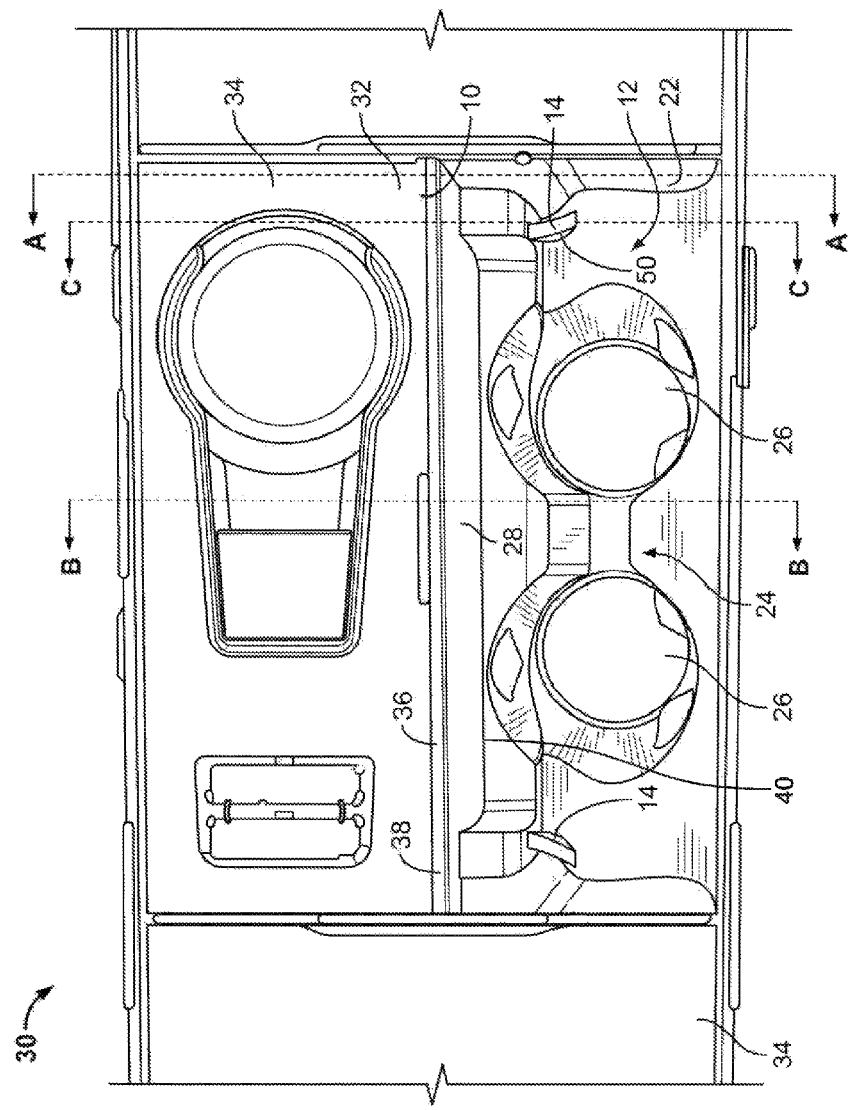
FIG. 2 is a top view of the console assembly of FIG. 1 in an open configuration.
Figure 3:
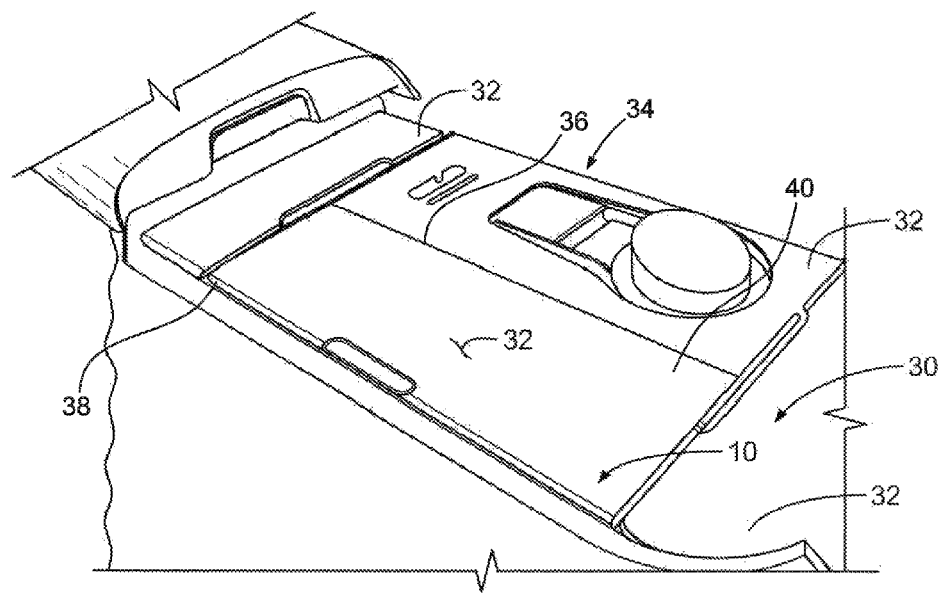
FIG. 3 is a perspective view of the exterior of the console assembly of FIG. 1 in a closed configuration.
Figure 4:
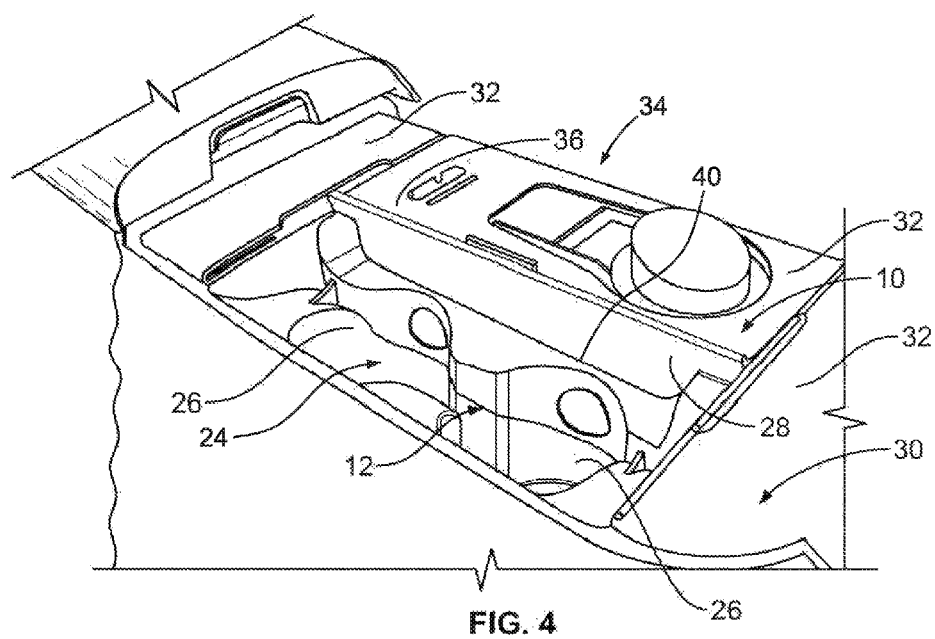
FIG. 4 is a perspective view of the exterior of the console assembly of FIG. 1 in an open configuration.

As shown in FIGS. 2-4, the mounting mechanism described herein can be used to operatively mount a door 10 over a compartment 12 found within a vehicle interior. Such a compartment 12 and the associated door 10 can be used in connection with a number of different vehicle interior structures and can be positioned or adapted as needed depending on the particular location thereof within the vehicle interior. As shown in FIGS. 3 and 4, the compartment 12, according to an example described herein can be positioned along a center console 30 of the vehicle interior. Further, such compartment 12 can be configured with a compartment housing 22 defining a compartment cavity 24 with separate cup holder portions 26 such that compartment 12 can be used for the storage and/or securement of beverage containers, with door 10 allowing a user to cover compartment 12 with door 10 so as to generally conceal the cup holder portions 26 when not in use. As shown in FIG. 4, portions of the cup holder portions 26 can be defined on an underside 28 of door 10, as such configuration may be useful depending on the desired depth of cup holders 26 compared to the overall depth of compartment cavity 24, for example.

As shown in FIG. 3, compartment 12 and, accordingly, door 10 can be positioned along console 30 such that door 10, including outer surface 32 thereof, is aligned with adjacent substrates 34 of other components of console 30. In particular, a free edge 38 and an anchored edge 40, which is positioned opposite free edge 38, may be positioned adjacent another edge 36 of one such other substrate 34 of console 30. In such an arrangement, limited space may be available for the opening and closing of door 10. Accordingly, the mechanism described herein may be such that door 10 opens along a path, described in greater detail below, in which anchored edge 40 moves away from any adjacent portions of console 30 simultaneously with rotation of door 10 toward an open position (as shown in FIGS. 2 and 4, for example). In the example of door 10 and the associated opening mechanism described herein, such motion may include movement of anchored edge 40 in a direction into compartment cavity 24, at least initially, in a generally vertical direction.

Figure 5:
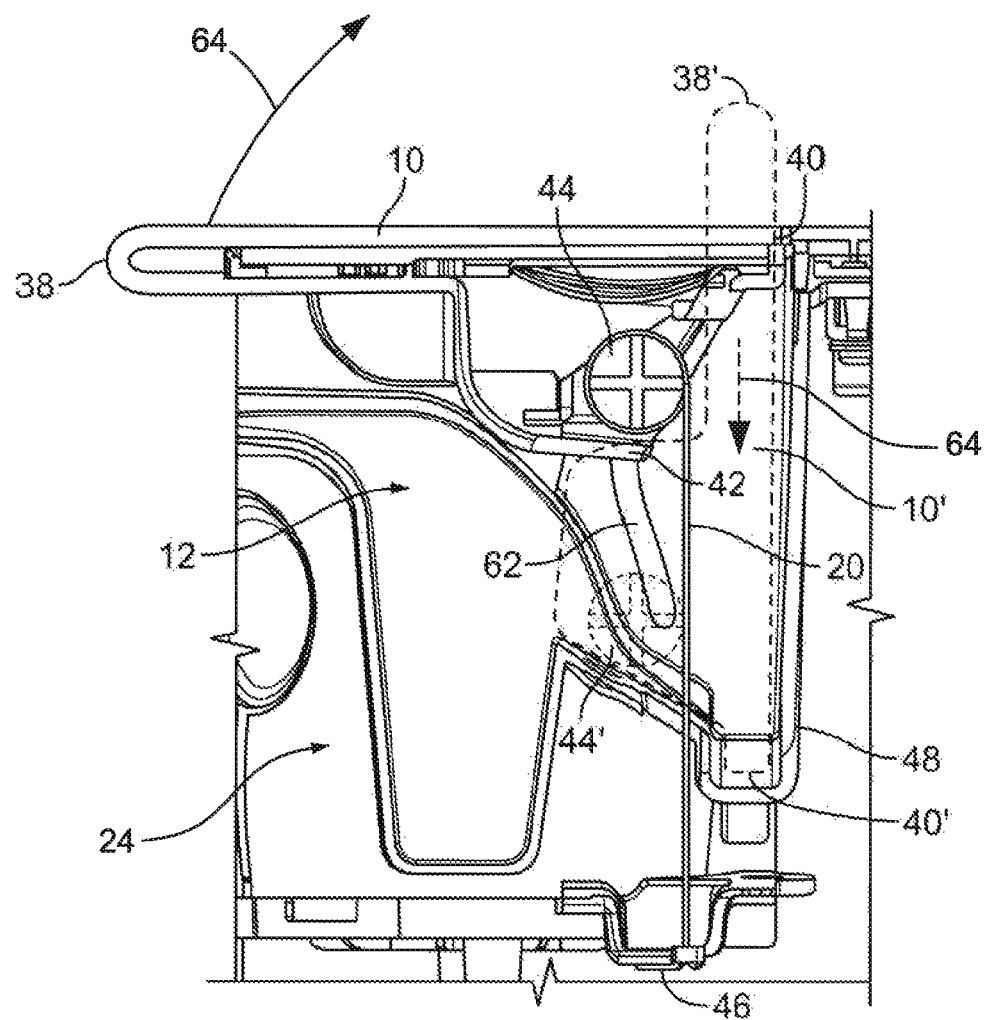
FIG. 5 is a cross-sectional elevation view of the console assembly of FIG. 1 through line B-B.

As shown in FIG. 5, movement of door 10 in an opening direction (i.e. from the closed position shown in FIG. 3 to the open position shown in FIG. 4 and indicated by the dashed line representation of door 10' in FIG. 5) can be driven by a single spring 20 coupled between door 10 along a portion thereof adjacent anchored edge 40 at a first end thereof and coupled at a second end thereof to a portion of compartment 12 that is generally vertically aligned with the portion of spring 20 coupled with door 10. Such an arrangement allows the spring 20 to act with a force in the general direction of the desired movement of anchored edge 40 throughout the opening motion of door 10. Because, as described further below, the rotational movement of door 10, and any other translational movement thereof, is linked to the generally vertical movement of anchored edge 40, a single spring, positioned generally as shown in FIG. 5, can be used to drive the entire opening motion of door 10. It is noted that, as shown herein, such orientation of spring 20 along the general direction of movement of anchored edge 40 does not have to correspond directly with the path 64 of movement of anchored edge 40. As shown in FIG. 5, such a path 64 may be along a generally sinusoidal path, but may still have a major directional component coinciding with the orientation of spring 20 in the closed position for door 10. To accommodate such non-linear movement of anchored edge 40, spring 20 may flex or bend somewhat during an opening motion for door 10 while pulling anchored edge 40 thereof by contraction of spring 20.

In an embodiment, spring 20 may be a constant-force spring, which may allow spring 20 to drive the above-described motion of door 10 through the entire range of motion of door 10, while being packaged with an efficiently-sized area. In general, a constant-force spring, such as spring 20, may be constructed such that it does not follow Hoek's law, meaning that the force provided thereby is not linearly dependent on the length by which spring 20 is extended, compared with its initial position. An example of such a constant-force spring may include a coiled strip of metallic material, such as spring steel or the like. An interior end of such a coiled strip may be anchored to one component and the opposite end thereof can be affixed with another component. A housing 42 may be positioned around the coil and anchored with the interior end of the metallic strip to anchor such end, as well as the coil, with one component, which in the example shown in FIG. 5 may be door 10. The exterior end of the coil 44 may extend outwardly from the coil housing 42 and may be anchored to the other component, which in the example shown in FIG. 5 can be a portion of compartment housing 22. In this arrangement varying amounts of coil 44 associated with end 46 may extend outwardly from coil 44 as between a portion of door 10 adjacent anchored end 40 and the aligned portion of compartment housing 22. Spring 20 may be configured such that, in a rest position thereof, end 46 would be positioned adjacent to or within housing 42. Accordingly, spring 20 would be in a generally extended position when door 10 is in both the open position and the closed position. Spring 20 can, thusly, act so as to provide a contracting force pulling anchored edge 40 of door 10 in a direction toward end 46 throughout the range of motion for door 10. Due to the construction of spring 20 described herein, such a contracting force, while possibly varying somewhat during the opening motion of door 10, may be generally constantly present, throughout the opening motion of door 10, including both in the fully open and fully-closed position.

Figure 6:
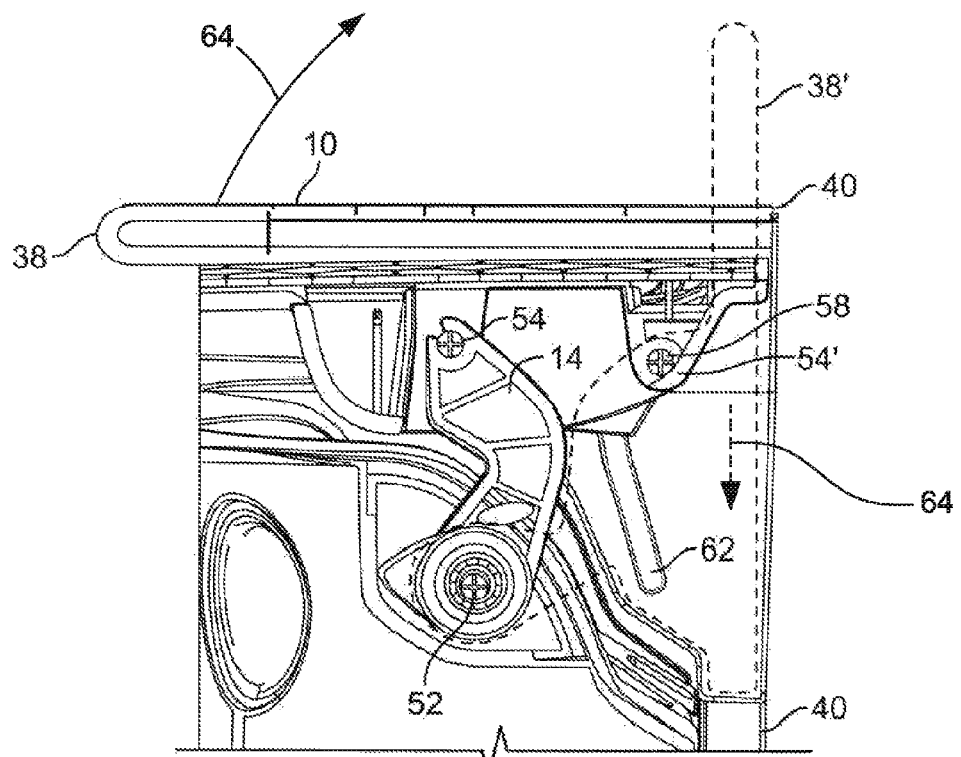
FIG. 6 is a cross-sectional elevation view of the console assembly of FIG. 1 through line C-C.

As shown in FIG. 6, the mechanism for mounting door 10 to compartment 12 can include an arm 14 rotatably coupled at a first end thereof with a portion of compartment housing 22 about a primary axis 52. Arm 14 may be rotatably coupled at another end thereof to a portion of the door 10, such as to a hinge 54 thereof. Primary axis 52 can be positioned inward with respect to compartment 12 or, in other words, toward free edge 38, as compared to the positioning of the attachment of spring 20 with door 10. Further, the location of coupling between arm 14 and door 10, e.g. hinge 54, can be positioned toward free edge 38 relative to the location of anchored edge 40. In such a configuration, as anchored edge 40 moves in the generally vertical direction of track 16 in the opening motion under the contracting force of spring 20, door 10 rotates about secondary axis 58, which is aligned with track 16, as well as about hinge 54 with respect to arm 14. As shown in FIG. 6, this rotation may be toward a generally vertical position represented by the dashed line depiction of door 10', or may be toward various other positions, depending upon the location of compartment 12 within the associated vehicle.

The motion during opening of door 10 also includes rotation of arm 14 about primary axis 52 as anchored edge 40 moves along track 16. Such rotation of arm 14 about primary axis 52 constrains the motion of door 10 so as to include a translational component in a lateral direction, such as about the location of hinge 54 such that hinge 54 moves toward a position generally vertically aligned with the location of primary axis 52, at least by the time door 10 reaches the open position. Stated another way, during opening door 10 can rotate both about primary axis 52 and about secondary axis 58, which may itself translate along track 16. This movement allows door 10 to open such that free edge 38 moves having a horizontal component sufficient to traverse the associated opening of compartment 12, allowing access thereto, while door 10 simultaneously retracts at least partially into compartment cavity 24. As discussed above, such motion is driven by a single spring 20. As shown in FIG. 5, compartment cavity 24 can define a pocket 48 that is shaped to at least partially receive door 10' therein, when in the open position.

Figure 7:
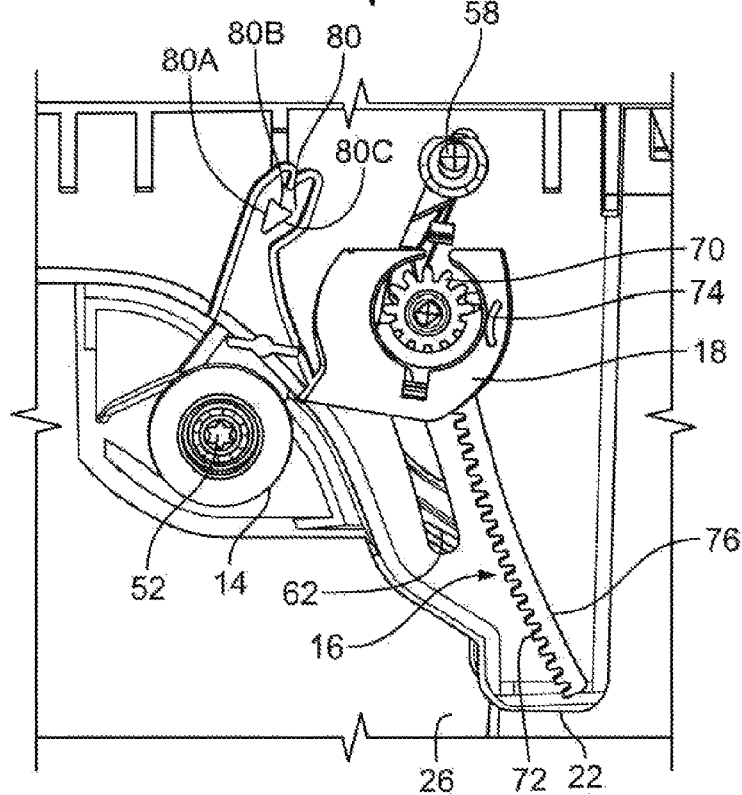
FIG. 7 is a cross-sectional elevation view of the console assembly of FIG. 1 through line A-A.

As shown in FIGS. 1 and 7, anchored edge 40 is rotatably coupled with a carrier 18 that is operatively engaged with a slot 62 defined in track 16. Such coupling can allow door 10 to rotate about secondary axis 58 while carrier 18 facilitates the translational movement of secondary axis 58 along path 64. As further illustrated in FIGS. 1 and 6, track 16, and accordingly path 64, may be in a curve or otherwise non-linear (e.g. sinusoidal or the like). This can be done to control both the instantaneous positioning of door 10 throughout the movement between the open position and the closed position, as well as to control the timing of the various other aspects of the movement of door 10 discussed above. For example, the particular path 64 shown in FIGS. 1 and 6 may result in door 10 initially rotating, during the opening motion thereof, about hinge 54, without substantial rotation of arm 14, or the corresponding translation movement of door 10 facilitated thereby. It is to be understood that such movement also includes rotation of door 10 relative to carrier 18 about secondary axis 58. Such initial movement can correspond with a portion of path 64 that is generally concave with respect to the location of hinge 54, for example.

At such a point where path 64 begins to curve in an opposite direction, e.g. toward a portion thereof that is generally convex with respect to the location of hinge 54, door 10, may begin to translate horizontally, as discussed above, as arm 14 begins to rotate about primary axis 52. Such movement may continue until a point where door 10 is in a generally vertical position, but is both horizontally and vertically displaced relative to the location thereof when door 10 is in the closed position. At such a point, path 64 may begin to turn toward the vertical direction, at which point arm 14 may continue to rotate about primary axis 52 and carrier 18 may move along track 16 such that door 10, while remaining generally vertical, translates toward the closed position. When moving from the open position to the closed position, such movement may generally be reversed.

To facilitate a generally smooth movement of door 10 during the above-described movement thereof carrier 18 may have a damper assembly 66 coupled thereto. Damper assembly 66 may be operatively coupled with a portion of track 16 and can be operative to provide a force to oppose or act partially against the force of spring 20 during opening of door 10, thereby slowing the speed at which spring 20 drives the opening of door 10. As shown in FIG. 1, damper assembly 66 can include a damper unit 68 fixedly coupled with carrier 18. Damper unit 68 can be a rotational damper having an input shaft associated therewith that is rotatable with respect to the remainder of the damper unit 68. Accordingly, damper unit 68 is operable to resist turning of the input shaft by a force that may be, for example, proportional to a velocity of which input shaft is turned. Various types of damper units 68 can be used to achieve such functionality, including viscous dampers, magnetic dampers, or the like. A gear 70 (FIG. 7) can be coupled with the input shaft (not shown) of damper unit 68 and can be operatively engaged with a series of teeth 72 associated with track 16. In the example shown in FIGS. 1 and 7, teeth 72 can extend along track 16 so as to be offset from, yet generally follow, the path 64 of slot 62 with which carrier 18 is slidably coupled. Teeth 72 may generally extend along a ridge 76 associated with track 16, which can serve as a guide for carrier 18 so as to maintain gear 70 associated with damper assembly 66 in a mesh relationship with teeth 72. For example, as shown in FIG. 7, a tab 74 can extend from a carrier 18 to engage with ridge 76 so as to slide there along during the movement of carrier 18 along track 16 during opening and closing of door 10.

In this arrangement, as spring 20 begins to pull door 10 toward the open position, damper assembly 66 can control the velocity with which door 10 moves. For example, door 10 may accelerate initially in such movement until the velocity thereof becomes sufficient to generate a force by damper unit 68 to oppose the force of spring 20 to a degree, thereby keeping the opening movement of door 10 such that it is not so fast so as to potentially damage portions thereof or the associated opening mechanism, or to cause discomfort for the user thereof As described above, the mounting mechanism of door 10 with respect to compartment 12 is configured such that door 10 is biased toward the open position as shown in the dashed line depiction of door 10' in FIGS. 5 and 6. A latch 78 is coupled with carrier 18 and operable to retain door 10 in a closed position over compartment 12, when desired by a user. Latch 78 is positioned on carrier 18 such that when door 10 is in the closed position and carrier 18 is, accordingly, in an uppermost position with respect to track 16, latch 78 will align with a corresponding notch 80 that is fixed with respect to the compartment 12 such as by being integrally formed with compartment housing 22. As shown in FIG. 7, notch 80 can be configured such that latch 78 can engage therewith in a push-push relationship. As such, notch 80 can include a first portion 80A that is shaped so as to receive latch 78 therein as carrier 18 moves in the generally vertical direction during closing of door 10. Once door 10 is moved into the fully closed position, such as by manipulation by a user, latch 78 will have reached the end of the first portion 80A of notch 80, which will prevent further movement of door 10. When the closing force such as implemented by a user ends, the force of spring 20 may move door 10 slightly in the opposite direction, which will move latch 78 into engagement with the second portion 80B of notch 80 which is positioned so as to oppose further movement of door 10 toward the open position. Such positioning of latch 78 within notch 80 can serve to maintain door 10 in the closed position against the opening force provided by spring 20. When, for example, a user desires to open door 10 they may push on outer surface 32 of door 10, at least anywhere in a location between free edge 38 and hinge 54, to cause rotation of door 10 away from the closed position thereby releasing latch 78 from out of second portion 80B of notch 80 and then releasing door 10, at which point latch 78 will move into third portions 80C of notch 80 in which latch 78 is disengaged from second portion 80B and permitted to exit notch 80, thereby allowing door 10 to move under force of spring 20, as opposed somewhat by damper assembly 66, into the open position as discussed above.

The above described positioning of latch 78 on carrier 18, as well as the related positioning of notch 80, can be such that door 10 can be unlatched from the closed position by force from a user on a large portion of outside surface 32 of door 10. Further, such positioning of latch 78 can be such that latch 78 is concealed within console 30, thereby reducing the likelihood that the mechanism of latch 78 and/or notch 80 becomes contaminated by debris or other extraneous items or elements within the vehicle interior. Further, such relative positioning of latch 78 and notch 80 can provide for efficient operation therebetween by taking advantage of the generally linear travel of carrier 18, at least within the upper portion of movement thereof.

Figure 8:
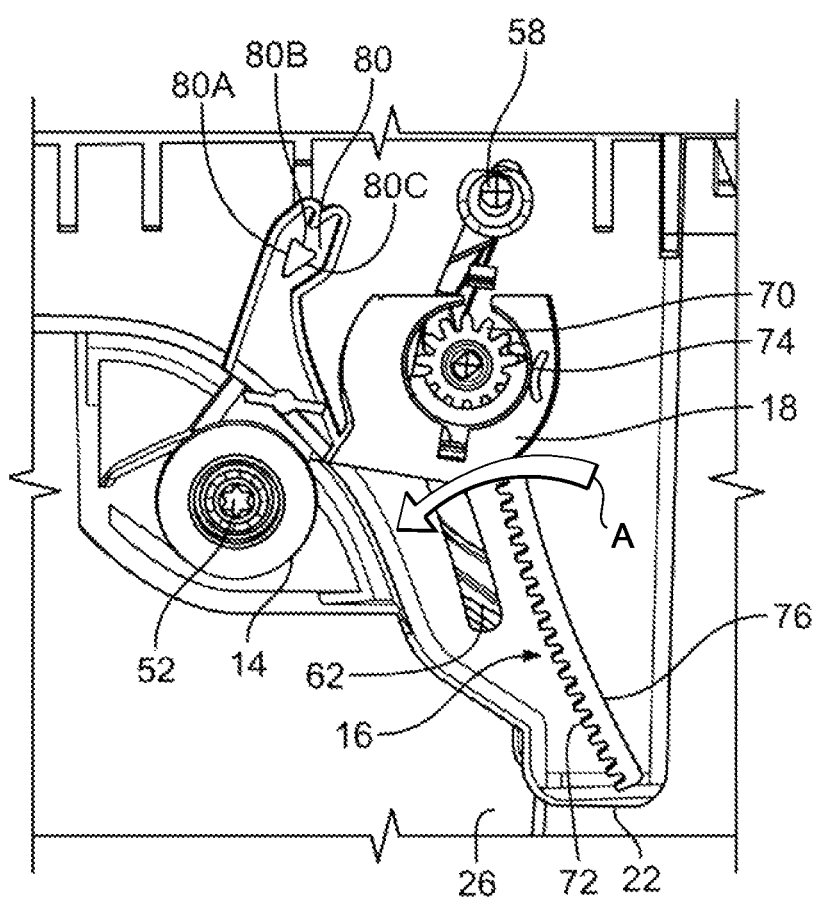
FIG. 8 depicts disengagement of a carrier from a track in the console assembly of FIG. 1.

Consideration was given to the potential problem of carrier 18 dislodging from track 16, for example as a result of undue force applied by a user to the door 10 in areas other than at the described latch 78 causing tab 74 to dislodge from track 16. This is shown in FIG. 8 (see Arrow A). In this situation, while door 10 would open, the mechanism would malfunction and door 10 could not then be re-closed without repair or replacement.

Figure 9:
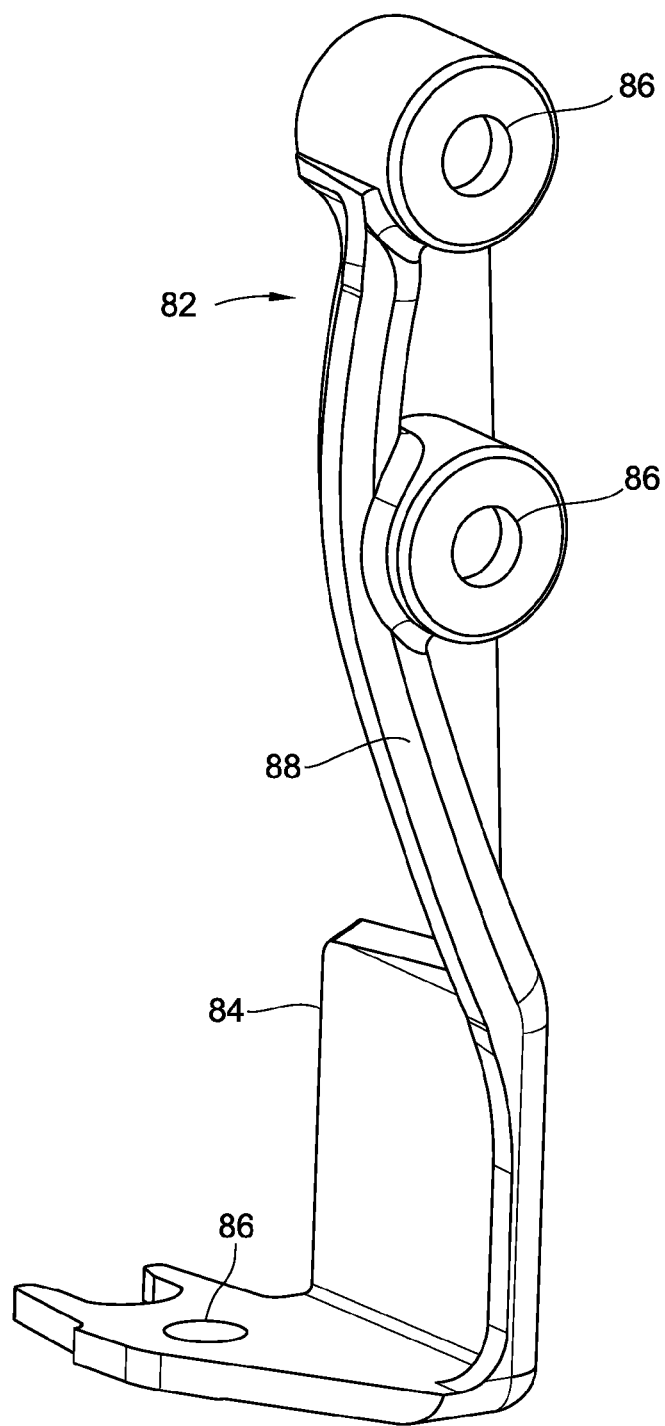
FIG. 9 shows a track cover for inclusion in the console assembly of FIG. 1.

To address this potential issue, with reference to FIG. 9 in an embodiment a track cover 82 is provided for inclusion in the above-described mechanism. Track cover 82 is defined by a body 84 including one or more attachment points 86 and defining a retaining flange 88 along a length dimension thereof.

Figure 10:
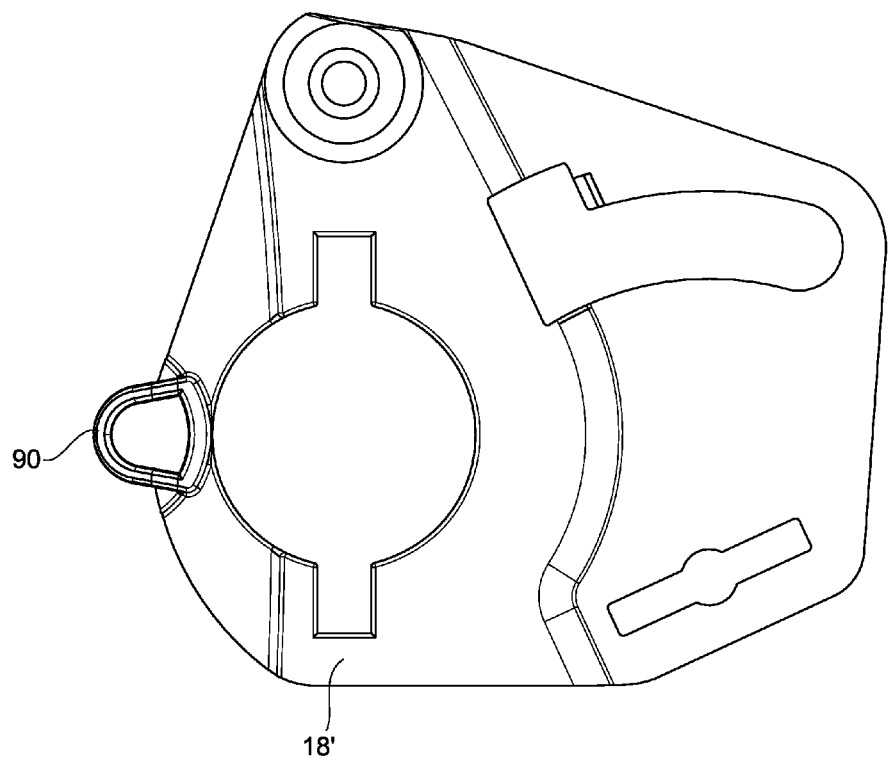
FIG. 10 shows an alternative embodiment of a carrier for the console assembly of FIG. 1.
Figure 11:
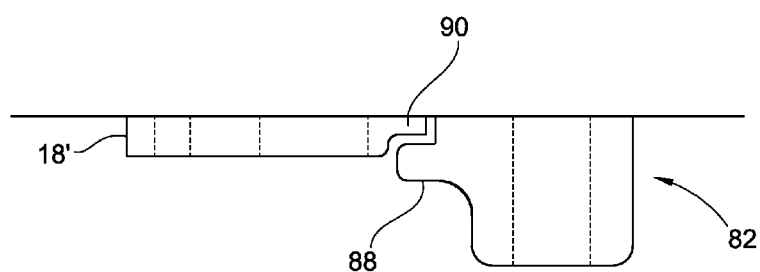
FIG. 11 shows a top plan view of a carrier/track cover assembly.
Figure 12:
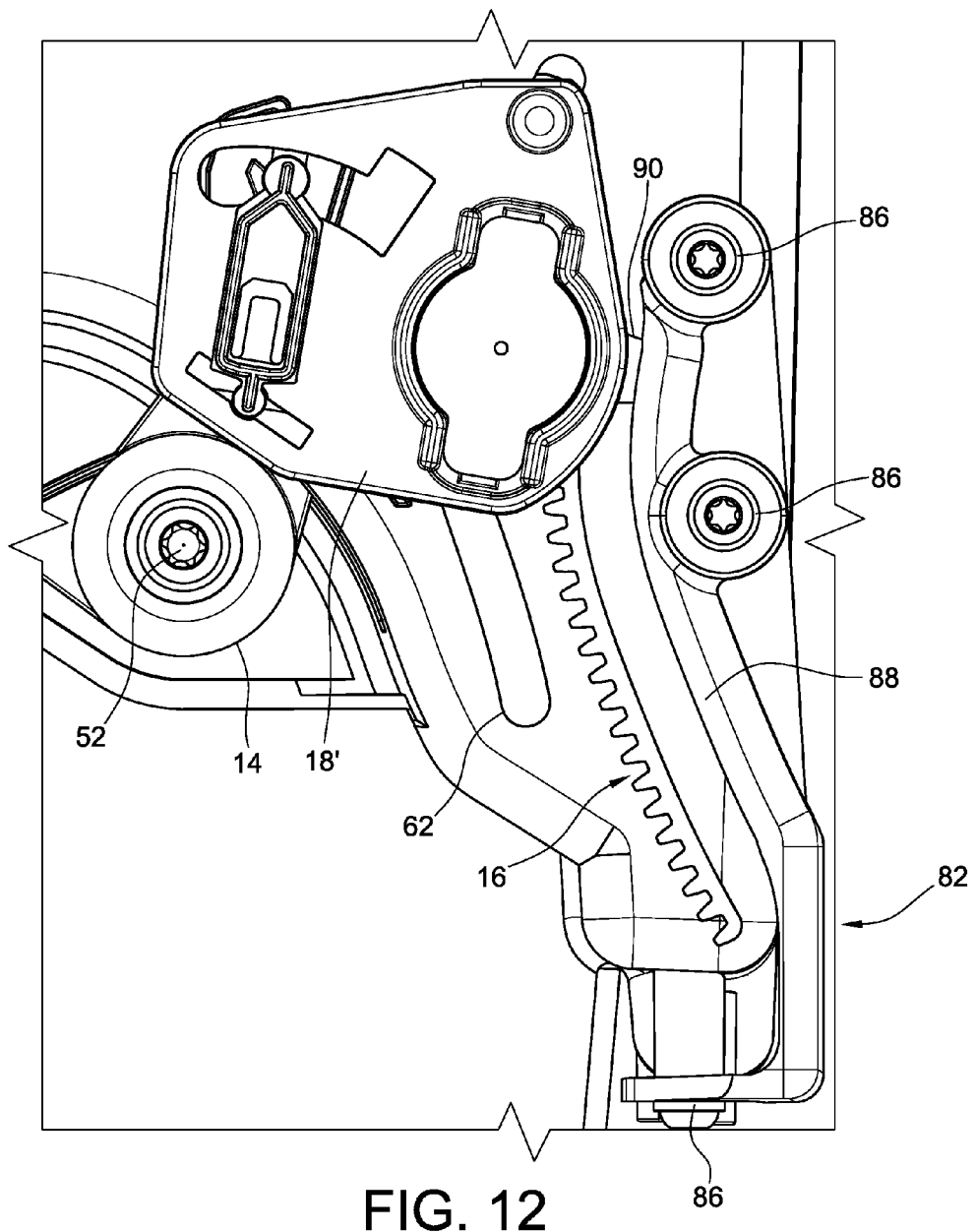
FIG. 12 shows a console assembly including the track cover of FIG. 9 and the carrier of FIG. 10.

In turn, an alternative embodiment of carrier 18, designated as carrier 18' in FIG. 10, is provided. The structure and configuration of carrier 18' is substantially as provided supra for carrier 18, with the exception that carrier 18 includes a retaining tab 90. As will be appreciated by reading the present disclosure and in light of the appended drawing Figures, carrier 18' and track cover 82 are configured whereby when track cover 82 is fastened to the above described console mechanism (see FIG. 12), carrier retaining tab 90 is engaged by a groove defined by track cover retaining flange 88 (see FIGS. 11 and 12).

By this engagement, carrier 18' is restricted in its movement in the x-axis, preventing disengagement of the carrier from the track 16.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It is to be understood that variations and modifications can be made on the aforementioned structure without departing from the concepts of the present invention, and further it is to be understood that such concepts are intended to be covered by the following claims unless these claims by their language expressly state otherwise.

What is claimed:

1. An assembly for mounting a door with a vehicle compartment, comprising:
    an arm coupled with the compartment and with the door;
    a carrier rotatably coupled with the door and slidably translatable along the track;
    a track; and
    a track cover configured for engaging a portion of the carrier.

2. The assembly of claim 1, wherein contraction of a spring coupled between the door and the compartment causes the door to move with a rotation of the arm and translation of the carrier along the track.

3. The assembly of claim 2, wherein the rotation of the arm is associated with rotation of the door during opening thereof about a fixed axis, and wherein the translation of the carrier along the track is associated with rotation of the door during opening about a moving axis at a point of rotatable coupling between the carrier and the door.

4. The assembly of claim 1, wherein the carrier includes a retaining tab for engaging a portion of the track cover.

5. The assembly of claim 4, wherein the track cover includes a flange for engaging the retaining tab.

6. The assembly of claim 2, wherein the spring is a constant-force spring having a coil coupled with the door and an end coupled with the compartment.

7. A vehicle interior console, comprising:
a compartment having a track fixed therewith;
a door coupled with the track about an axis;
a carrier rotatably coupled with the door and slidably translatable along the track; and
a track cover configured for engaging a portion of the carrier.

8. The console of claim 7, further including a door mounting mechanism comprising an arm coupled between the compartment and the door and a spring coupled between the door and the compartment such that a contraction force of the spring causes the door to move with rotation of the arm and translation of the carrier along the track.

9. The console of claim 8, wherein the compartment defines at least one cup holder compartment, and wherein the door is further movable against the spring contraction force to a closed position.

10. The console of claim 7, wherein the compartment defines a door pocket, and wherein the contraction of the spring causes the door to move from a closed position to an open position with at least a portion of the door disposed within the door pocket.

11. The console of claim 7, wherein the carrier includes a retaining tab for engaging a portion of the track cover.

12. The console of claim 1, wherein the track cover includes a flange for engaging the retaining tab.

13. A vehicle interior compartment assembly, comprising:
a housing defining an opening and having a track fixed therewith;
a door positionable over the opening; and
a carrier slidably coupled with the track and rotatably coupled with the door; and
a track cover configured for engaging a portion of the carrier.

14. The assembly of claim 13, wherein the carrier includes a damper fixed therewith.

15. The assembly of claim 13, wherein:
the track includes a plurality of teeth spaced along a length thereof; and
the door is moveable between an open position and a closed position by a movement comprising translation of the carrier along the track.

16. The assembly of claim 13, further including:
an arm coupled between the cavity housing and the door; and
a spring coupled between the door and the cavity housing such that a contraction of the spring alone causes the door to move with a rotation of the arm with respect to the cavity housing, translation of the carrier along the track, and rotation of the door with respect to the carrier and with respect to the arm.

17. The assembly of claim 13, wherein the carrier includes a retaining tab for engaging a portion of the track cover.

18. The assembly of claim 17, wherein the track cover includes a flange for engaging the retaining tab.

* * * * *